D. McAfee,
Glass Furnace.
No. 51,068. Patented Nov. 21, 1865.
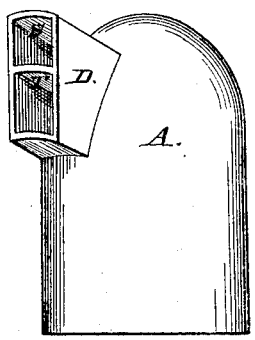
Fig. 1.
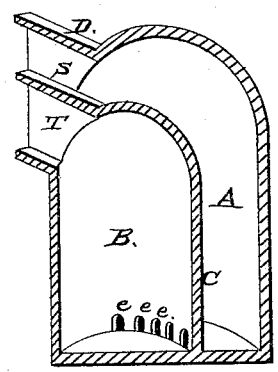
Fig. 2.
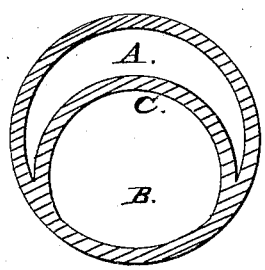
Fig.
Witnesses:
Josiah W. Ells
C. S. Ammons
Inventor.
Daniel McAfee.

United States Patent Office.

DANIEL McAFEE, OF PITTSBURG, PENNSYLVANIA.

IMPROVEMENT IN GLASS-POTS.

Specification forming part of Letters Patent No. 51,068, dated November 21, 1865.

*To all whom it may concern:*

Be it known that I, DANIEL McAFEE, of the city of Pittsburg, in the county of Allegheny and State of Pennsylvania, have invented a new and useful Improvement in Glass-House Pots; and I hereby declare that the following is a full, clear, and exact description of my invention, reference being had to the accompanying drawings, forming part of this specification, and to the letters of reference marked thereon.

The nature of my invention consists in forming glass-house pots with a partition-wall, dividing the interior into two compartments, each communicating with the outside through the neck and with each other through a series of small openings at the bottom, and so constructed as that the "batch" or composition may be thrown into one apartment, and as it melts pass through the openings in the bottom of the partition into the other apartment, from which it can be taken and worked in the usual manner, whereby the various processes of filling, melting, and working from the same pot may be carried on without interfering one with the other.

To enable others skilled in the art to understand and make my improvement, I will proceed to describe my invention by reference to the accompanying drawings, wherein—

Figure 1 represents an outside view of my glass-house pot. Fig. 2 is a vertical section, showing the interior. Fig. 3 is a transverse or cross section of the same.

All the drawings are lettered, and similar letters denote corresponding parts in the several views.

I construct, of clay or other material, a pot in the usual way, the outside of which resembles those already in use; but in order to carry out the object I have in view, I divide the interior into two or more chambers, A B, by means of a partition, C, which extends from the bottom of the pot to the outside of the neck D, forming two mouths, S T. At or near the bottom of the partition C are a series of openings, *e e e*, extending from one apartment to the other.

The operation is as follows: The pot is placed in the furnace and made hot. The batch or composition is then thrown into the chamber A through the upper mouth, S, which, as it melts or becomes liquefied by the heat, flows through the small openings *e e e* in the bottom of the partition C into the chamber B, from whence it is worked out of the lower mouth, T, in the usual manner.

Having thus briefly described my invention, what I claim is—

A glass-house pot with a partition-wall dividing the interior into two or more compartments, each communicating with the outside through the neck and with each other through a series of openings at the bottom, and so constructed as that the batch or composition as it melts in one apartment will flow through into the other, from whence it can be taken and worked in the usual manner.

DANIEL McAFEE.

Witnesses:
  JOSIAH W. ELLS,
  C. S. AMMOND.